June 1, 1948.   D. M. FINCH   2,442,560
LOW VOLTAGE DIRECT CURRENT INVERTER
Filed June 10, 1944
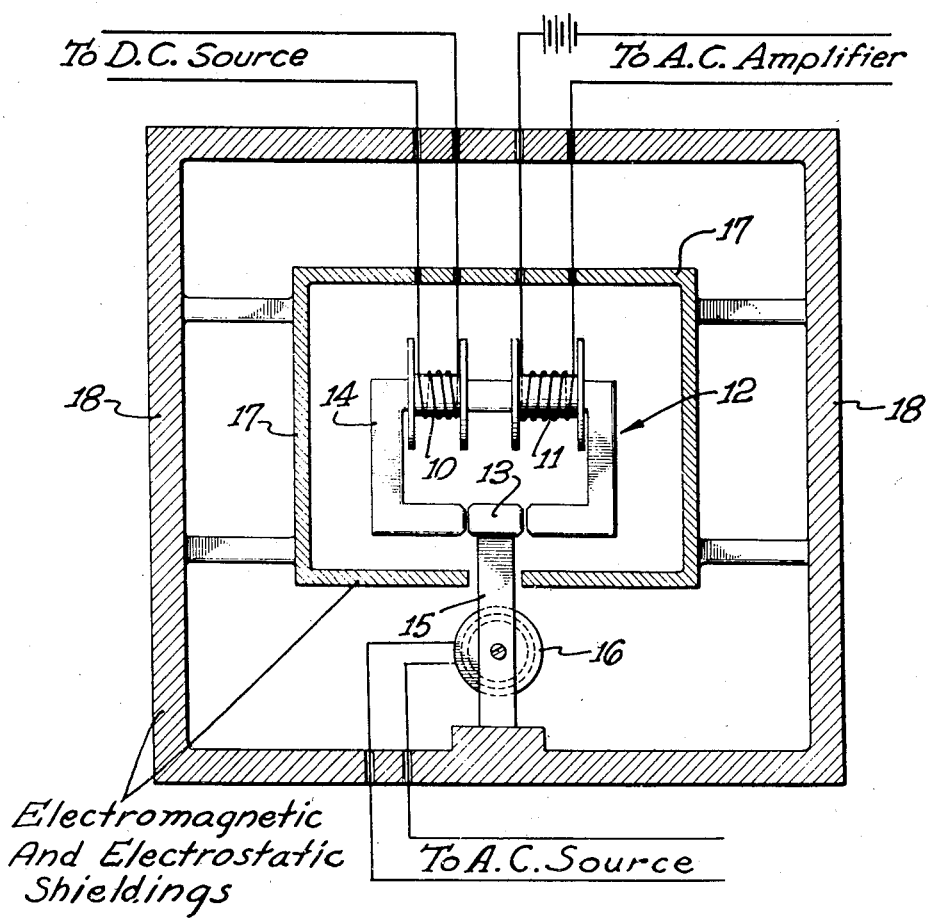
Dan M. Finch,
INVENTOR.
BY Oscar A. Mellin
ATTORNEY.

Patented June 1, 1948

2,442,560

UNITED STATES PATENT OFFICE 2,442,560

LOW VOLTAGE DIRECT-CURRENT INVERTER

Dan M. Finch, Berkeley, Calif.

Application June 10, 1944, Serial No. 539,714

2 Claims. (Cl. 171—123)

The present invention relates to an inverter device for changing from direct current to alternating current, and more particularly to an inverter especially adapted for low voltage and current operation.

The small D. C. voltage and current output from thermocouples, thermopiles, barrier layer photo-sensitive cells and similar devices has required that they be connected to extremely sensitive measurement and control instrumentalities for their effective utilization. Such instrumentalities must be maintained in proper calibration and adjustment if they are to reflect accurately the low voltages generated by the D. C. source. It is an object of the present invention to lessen the necessity for such sensitive instrumentalities by providing an inverter device capable of converting the direct current into alternating current, which can then be readily amplified to any required magnitude and transmitted to measurement or control apparatus of greater stability and reliability than heretofore used.

In its general aspects, the invention contemplates the conversion of direct current to alternating current by varying the reluctance of a magnetic core at a desired frequency and within desired limits so that the magnetic flux induced in the core by direct current flowing through a coil wound around the core will be varied at the same frequency to cut the windings of another coil wound around the magnetic core and induce a voltage therein of alternating characteristics that bears a definite relationship to the direct current input voltage.

The invention is exemplified by the following description and illustrated by way of example in the accompanying drawing, in which the single figure is a diagrammatic view of an inverter arrangement for converting direct current to alternating current.

Referring to the accompanying drawing, two coils of wire 10, 11 wound from electrically conducting material are mounted upon a magnetic core 12 and are electrically insulated from each other and the core, but are arranged so that all of the magnetic flux set up in the core will link both coils except for leakage. One of the coils 10 is adapted to be connected to a source of direct current, such as supplied by a thermocouple or thermopile, and the other coil 11 is adapted to be connected to the alternating current circuit. The D. C. flowing through coil 10 determines a fixed number of ampere-turns within this coil, whose field induces a magnetic flux in the core which is varied by varying the reluctance of the magnetic core. The reluctance can be changed by moving part of the magnetic core with respect to the remainder of the core, as by causing the movable magnetic element 13 to vibrate, rotate, or otherwise undertake a rapid change in position relative to the remainder of the core 14 by suitable mechanized means. As disclosed in the drawing, the movable element 13 can be secured to an oscillating member 15 which is caused to vibrate by an electromagnet 16 at a desired frequency to shift the movable element 13 with respect to the remainder of the core.

The flux set up in the core by the direct current flowing through the D. C. coil 10 will vary due to the change in the reluctance of the magnetic path caused by the moving magnetic element 13. This changing magnetic flux will cut the windings of the A. C. coil 11 and develop a voltage at its terminals that is a function of the number of ampere-turns in the D. C. coil 10 and the rate of change of the magnetic reluctance of the core 12. Since the maximum rate of change of reluctance is constant for a fixed frequency of the movable element 13, the maximum A. C. voltage at the terminals of coil 11 is a direct function of the D. C. voltage imposed on coil 10.

The core 12 is preferably formed of magnetic material having a high initial permeability and low retentivity. It is preferred that the effective magnetic flux for zero input to coil 10 should be very low so that the output voltage from coil 11 will be low compared to the voltage to be measured. This may be accomplished by counteracting the residual magnetism in the magnetic core by superimposing a D. C. bucking voltage on the A. C. coil 11 which will set up flux whose direction is counter to that of the flux flowing through the core 12 as a result of its residual magnetism.

To prevent the picking up of stray fields and induced voltages, suitable magnetic and electrostatic shieldings 17, 18 are provided around the entire inverter arrangement.

From the foregoing it is apparent that a comparatively simple device has been provided for converting direct current voltages to alternating current voltages, lending itself particularly for use in conjunction with the amplification of the extremely small voltages generated by thermocouples, thermopiles and photo-conductive cells.

While I have shown a preferred form of the invention, it is to be understood that various changes may be made in its construction by those skilled in the art without departing from the spirit of the invention as defined in the appended claims.

Having thus described my invention, what I claim and desire to secure by Letters Patent is:

1. An inverter comprising a magnetic core having a movable part, a conductive D. C. input coil mounted on said core, a conductive A. C. output coil mounted on said core, means for moving said movable core part at a predetermined frequency with respect to the remainder of said core to vary the reluctance of said magnetic core and induce A. C. voltage in said output coil which is a direct function of the D. C. flowing through said input coil, and means for superimposing a D. C. voltage on the A. C. output coil to set up a flux whose direction is counter to that of the flux flowing through the magnetic core as a result of its residual magnetism.

2. An inverter comprising a magnetic core having a movable part, a conductive D. C. input coil mounted on said core, a conductive A. C. output coil on said core, means for moving said movable core part at a predetermined frequency with respect to the remainder of said core to vary the reluctance of said magnetic core and induce A. C. voltage in said output coil which is a direct function of the D. C. flowing through said input coil, means for imposing a D. C. voltage on the A. C. output coil to set up a flux whose direction is counter to that of the flux flowing through the magnetic core as a result of its residual magnetism, and electromagnetic and electrostatic shielding enclosing said magnetic core, input coil and output coil.

DAN M. FINCH.

REFERENCES CITED

The following references are of record in the file of this patent:

UNITED STATES PATENTS

| Number | Name | Date |
|---|---|---|
| 644,995 | Moore | Mar. 6, 1900 |
| 1,659,729 | Gannett | Feb. 21, 1928 |
| 1,784,844 | Morrison | Dec. 16, 1930 |
| 1,843,525 | Thomas et al. | Feb. 2, 1932 |
| 2,113,164 | Williams | Apr. 5, 1938 |
| 2,164,541 | Och | July 4, 1939 |
| 2,160,876 | Lackatos | June 6, 1939 |
| 2,342,628 | Evjen et al. | Feb. 29, 1944 |
| 2,347,200 | Lehde | Apr. 25, 1944 |
| 2,404,342 | Harrison | July 16, 1946 |